(12) United States Patent
Huebinger et al.

(10) Patent No.: US 11,278,965 B2
(45) Date of Patent: Mar. 22, 2022

(54) APPARATUS FOR PRODUCING A THREE-DIMENSIONAL WORK PIECE WITH IMPROVED GAS FLOW

(71) Applicant: SLM Solutions Group AG, Luebeck (DE)

(72) Inventors: Isabell Huebinger, Luebeck (DE); Jan Wilkes, Luebeck (DE); Naveed Iqbal, Luebeck (DE); Andreas Wiesner, Luebeck (DE); Eduard Gieser, Luebeck (DE)

(73) Assignee: SLM SOLUTIONS GROUP AG, Luebeck (DE)

( * ) Notice: Subject to any disclaimer, the term of this patent is extended or adjusted under 35 U.S.C. 154(b) by 259 days.

(21) Appl. No.: 16/410,664

(22) Filed: May 13, 2019

(65) Prior Publication Data

US 2019/0262901 A1 Aug. 29, 2019

Related U.S. Application Data

(63) Continuation of application No. PCT/EP2017/077295, filed on Oct. 25, 2017.

(30) Foreign Application Priority Data

Nov. 11, 2016 (EP) ..................... 16198446

(51) Int. Cl.
*B22F 12/00* (2021.01)
*B29C 64/371* (2017.01)
(Continued)

(52) U.S. Cl.
CPC ............ *B22F 12/00* (2021.01); *B29C 64/153* (2017.08); *B29C 64/20* (2017.08); *B29C 64/371* (2017.08);
(Continued)

(58) Field of Classification Search
CPC ....... B22F 12/00; B29C 64/20; B29C 64/371; B29C 64/264; B33Y 30/00; B33Y 40/00
See application file for complete search history.

(56) References Cited

U.S. PATENT DOCUMENTS 6,583,379 B1 * 6/2003 Meiners ............... B23K 26/123
219/121.6
8,062,020 B2 11/2011 Abe
(Continued)

FOREIGN PATENT DOCUMENTS

| CN | 102186554 | 9/2011 |
|---|---|---|
| CN | 105382257 | 3/2016 |

(Continued)

OTHER PUBLICATIONS

China Office Action, Counter China Appln. No. 201780062348.5, 11 pgs., dated Nov. 4, 2020.
(Continued)

*Primary Examiner* — Yung-Sheng M Tsui
(74) *Attorney, Agent, or Firm* — Taft Stettinius & Hollister LLP

(57) ABSTRACT

An apparatus including a process chamber accommodating a carrier for receiving a raw material powder. An irradiation device of the apparatus is configured to selectively irradiate electromagnetic or particle radiation onto the raw material powder on the carrier in order to produce a work piece by an additive layer construction method, wherein a transmission element allows the transmission of the electromagnetic or particle radiation into the process chamber. The apparatus further includes a gas inlet and a gas outlet for supplying and discharging gas to and from the process chamber which are configured to generate a protective gas stream for protecting the transmission element from being contaminated by impu-
(Continued)

Figure 1:
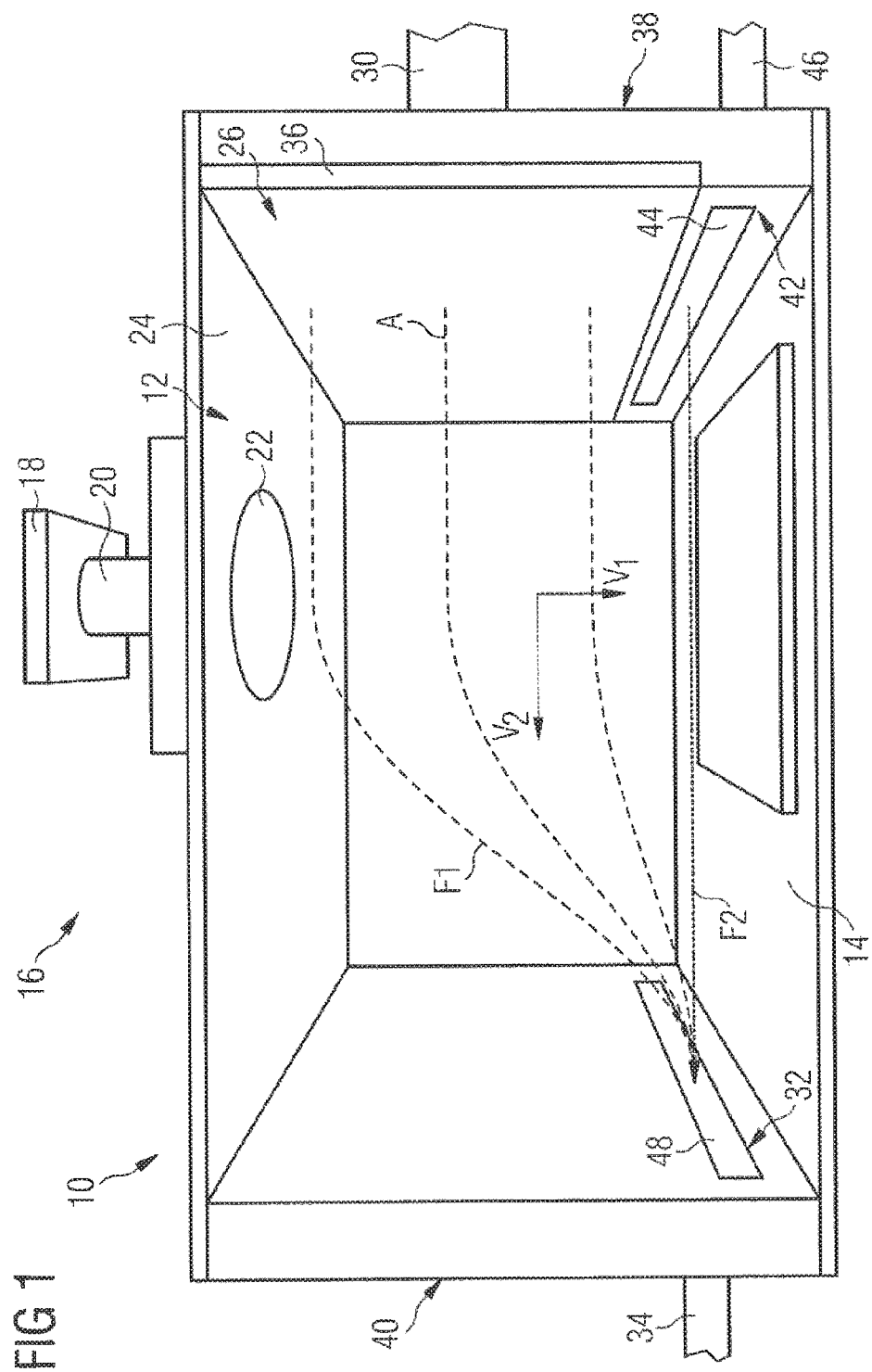

rities present in the process chamber. The gas inlet includes a gas permeable, porous component forming a gas inlet area.

16 Claims, 2 Drawing Sheets

(51) Int. Cl.
*B29C 64/153* (2017.01)
*B29C 64/20* (2017.01)
*B33Y 10/00* (2015.01)
*B33Y 30/00* (2015.01)
*B33Y 40/00* (2020.01)
*B22F 10/10* (2021.01)
*B29C 64/264* (2017.01)

(52) U.S. Cl.
CPC ............ *B22F 10/10* (2021.01); *B29C 64/264* (2017.08); *B33Y 10/00* (2014.12); *B33Y 30/00* (2014.12); *B33Y 40/00* (2014.12); *Y02P 10/25* (2015.11)

(56) References Cited

U.S. PATENT DOCUMENTS

| | | | |
|---|---|---|---|
| 8,794,263 B2 | 8/2014 | Scott et al. | |
| 9,228,685 B2 | 1/2016 | Kobayashi et al. | |
| 9,776,362 B2 | 10/2017 | Chuang et al. | |
| 2009/0169664 A1 | 7/2009 | Cox | |
| 2015/0125335 A1* | 5/2015 | Bruck | C22C 1/0416 419/26 |
| 2015/0174823 A1 | 6/2015 | Wiesner et al. | |
| 2015/0367574 A1 | 12/2015 | Araie et al. | |
| 2016/0059309 A1 | 3/2016 | Junker et al. | |
| 2016/0059310 A1 | 3/2016 | Junker et al. | |
| 2016/0114531 A1 | 4/2016 | Chuang et al. | |
| 2018/0126649 A1* | 5/2018 | Romano | B29C 64/371 |
| 2019/0105835 A1* | 4/2019 | Chanclon Fernandez | B29C 64/255 |

FOREIGN PATENT DOCUMENTS

| | | |
|---|---|---|
| CN | 105382258 | 3/2016 |
| EP | 0289116 A1 | 11/1988 |
| EP | 1839781 A2 | 10/2007 |
| EP | 1793979 B1 | 2/2009 |
| EP | 2687305 | 1/2014 |
| EP | 3015198 A1 | 5/2016 |
| JP | 05335278 | 12/1993 |
| JP | 06158284 | 6/1994 |
| JP | 2018003148 | 1/2018 |
| TW | 201615388 | 5/2016 |
| WO | 2004076102 | 9/2004 |
| WO | 2012077547 | 6/2012 |

OTHER PUBLICATIONS

Indian Examination Report, Counter Indian Appln. No. 201937014695, 7 pgs., dated Mar. 3, 2021.
Translation of part of Japanese Examination Report, Japanese Appln. No. 2019-524306, 2 pgs., dated May 20, 2020.
European Patent Office, Extended European Search Report in corresponding Application No. 16198446.3, dated May 15, 2017, 11 pp.
European Patent Office, International Search Report & Written Opinion in corresponding Application No. PCT/EP2017/077295, dated Feb. 20, 2018, 17 pp.
European Patent Office, International Preliminary Report on Patentability in corresponding Application No. PCT/EP2017/077295, dated Oct. 12, 2018, 22 pp.
China Office Action, Counter China Appln. No. 201780062348.5, 9 pgs., dated Apr. 6, 2021, with partial translation summarizing claim rejections.

* cited by examiner

APPARATUS FOR PRODUCING A THREE-DIMENSIONAL WORK PIECE WITH IMPROVED GAS FLOW

The present invention relates to an apparatus for producing a three-dimensional work piece by irradiating layers of a raw material powder with electromagnetic or particle radiation. The invention further relates to a method for producing a three-dimensional work piece.

Powder bed fusion is an additive layering process by which pulverulent, in particular metallic and/or ceramic raw materials can be processed to three-dimensional work pieces of complex shapes. To that end, a raw material powder layer is applied onto a carrier and subjected to electromagnetic or particle radiation in dependence on the desired geometry of the work piece that is to be produced. The electromagnetic or particle radiation penetrating into the powder layer causes heating and consequently melting or sintering of the raw material particles. Further raw material powder layers are then applied successively to the layer on the carrier that has already been subjected to radiation treatment, until the work piece has the desired shape and size. Powder bed fusion methods can be used in particular for the production of prototypes, tools, replacement parts or medical prostheses on the basis of CAD data.

An apparatus for producing moulded bodies form pulverulent raw material by a powder bed fusion process is described, for example, in EP 1 793 979 B1. The prior art apparatus comprises a process chamber which accommodates a plurality of carriers for the shaped bodies to be manufactured, A powder layer preparation system comprises a powder reservoir holder that can be moved to and fro across the carriers in order to apply a raw material powder to be irradiated with a laser beam onto the carriers. The process chamber is provided with a protective gas inlet and a protective gas outlet which are connected to a protective gas circuit. Via the protective gas inlet, a protective gas such as, for example, Argon is supplied to the process chamber in order to establish a protective gas atmosphere within the process chamber. Via the protective gas outlet, protective gas which, upon flowing through the process chamber, is loaded with particulate impurities such as, for example, residual raw material powder particles and welding smoke particles is withdrawn from the process chamber.

According to EP 1 839 781 A2, welding smoke generated in a powder bed fusion process upon irradiating and hence melting a raw material powder may contaminate the interior of a process chamber and also components of an irradiation system, such as, for example, a lens or window through which a radiation beam is directed into the process chamber. As a result, a gradually increasing part of the radiation energy emitted by the irradiation system may be absorbed by deposited welding smoke condensate material. EP 1 839 781 A2 therefore proposes to provide a protective gas conveying system with means for generating and maintaining a separation zone in the form of a protective gas flow layer between a product built-up zone and an upper wall of the process chamber which is specified as being almost impenetrable for welding smoke. In particular, the protective gas conveying system comprises an elongated nozzle which extends in a horizontal direction in a side wall of the process chamber. Via the nozzle, a protective gas, which is supplied to the nozzle at an elevated pressure by means of a compressor, is supplied to the process chamber in such a manner that a substantially laminar protective gas flow is generated. An outlet opening through which the protective gas is withdrawn from the process chamber by means of a blower is provided in a further side wall of the process chamber opposite to the nozzle.

The present invention is directed at the object of providing an apparatus and a method for producing a three-dimensional work piece by irradiating layers of a raw material powder with electromagnetic or particle radiation, wherein stable operating conditions during the time of operation can be maintained and thus high-quality work pieces can be produced.

This object is addressed by an apparatus as defined in claim 1 and a method as defined in claim 12.

An apparatus for producing a three dimensional work piece comprises a process chamber accommodating a carrier for receiving a raw material powder. The carrier may be a rigidly fixed carrier having a surface onto which the raw material powder is applied in order to be subjected to electromagnetic or particle radiation. Preferably, however, the carrier is designed to be displaceable in vertical direction, so that, with increasing construction height of a work piece, as it is built up in layers from the raw material powder, the carrier can be moved downwards in the vertical direction. The raw material powder applied onto the carrier within the process chamber is preferably a metallic powder, in particular a metal alloy powder, but may also be a ceramic powder or a powder containing different materials. The powder may have any suitable particle size or particle size distribution. It is, however, preferable to process powders of particle sizes <100 µm.

The apparatus further comprises an irradiation device for selectively irradiating electromagnetic or particle radiation onto the raw material powder on the carrier in order to produce a work piece made of said raw material powder by an additive layer construction method. Hence, the raw material powder applied onto the carrier may be subjected to electromagnetic or particle radiation in a site-selective manner in dependence on the desired geometry of the work piece that is to be produced. The irradiation device may comprise a radiation beam source, in particular a laser beam source, and additionally may comprise an optical unit for guiding and/or processing a radiation beam emitted by the radiation beam source. The optical unit may comprise optical elements such an object lens and a scanner unit, the scanner unit preferably comprising a diffractive optical element and a deflection mirror.

Moreover, the apparatus is provided with a transmission element which allows the transmission of the electromagnetic or particle radiation emitted by the irradiation device into the process chamber. The transmission element may, for example, be designed in the form of a window. Alternatively, the transmission element may comprise or consist of an optical element, in particular a lens, of the irradiation device. The transmission element may be arranged in a region of a wall of the process chamber, in particular in a region of a top wall of the process chamber. In a particular preferred embodiment of the apparatus, the transmission element is arranged in a region above the carrier in particular a center of the carrier. For example, the transmission element may be integrated into a wall, in particular the top wall of the process chamber.

The material of the transmission element may be selected in dependence on the type of the radiation emitted by the irradiation device in order to ensure the desired transmissibility of the transmission element for the electromagnetic or particle radiation emitted by the irradiation device. Further, the material of the transmission element should be selected in such a manner that the transmission element is capable of withstanding the thermal loads acting on the transmission element during operation of the apparatus for producing a three dimensional work piece. For example, the transmission element may be made of a glass material or a suitable polymer material. If desired, the transmission element, in the region of a surface facing the interior of the process chamber, may be provided with a surface layer which minimizes the adhesion and deposition of welding smoke condensate onto the surface of the transmission element.

The apparatus is further provided with a gas inlet for supplying gas to the process chamber. The gas supplied by the gas inlet may be an inert gas such as, for example, Argon, Nitrogen or the like. It is conceivable that the process chamber may be sealable against the ambient atmosphere, in order to be able to maintain a controlled atmosphere therein. The controlled atmosphere may be an inert gas atmosphere in order to prevent undesired chemical reactions, in particular oxidation reactions.

Further, the apparatus comprises a gas outlet for discharging gas from the process chamber. The gas outlet may be connected to a gas discharge line which in turn is connected to a gas supply line connected to the gas inlet so as to define a recirculation system to which gas exiting the process chamber via the gas outlet may be recirculated into the process chamber via the gas inlet. In order to remove the particulate impurities from gas discharged from the process chamber via the gas outlet prior to recirculating the gas into the process chamber via the gas inlet, a suitable filter arrangement may be provided in the recirculation system.

The gas inlet and the gas outlet are configured to generate a protective gas stream in the process chamber for protecting the transmission element from being contaminated by impurities present in the process chamber, e.g. powder particles or welding smoke rising from the raw material powder applied onto the carrier upon being irradiated with electromagnetic or particle radiation. The protective gas stream generated by the gas inlet and gas outlet serves to purge the particulate impurities generated in the process chamber upon irradiating the raw material powder on the carrier with electromagnetic or particle radiation from the process chamber. To that end, the protective gas stream ensures that particulate impurities are either prevented from reaching the transmission element or at least guided away from the transmission element. Specifically, the gas inlet and the gas outlet may be configured and arranged in such a manner that the protective gas stream in the process chamber flows across the transmission element. In other words, in a region of the transmission element, the protective gas stream at least partially may flow substantially parallel to the transmission element.

The gas inlet comprises a gas permeable, porous component forming a gas inlet area of the gas inlet. In this context, the term "porous" refers to a material property specifying a material which is provided with randomly distributed openings and/or inclusions. By means of the gas permeable, porous component, via which gas is supplied to the process chamber, the gas inlet ensures that a substantially laminar protective gas stream is generated in the process chamber. In other words, a gas flow to be supplied to the process chamber via the gas inlet, upon flowing through the gas permeable, porous component, is equalized, thereby constituting a laminar protective gas flow in the process chamber. Further, the gas permeable, porous component of the gas inlet ensures a homogenous inlet of gas across the entire gas inlet area of the gas inlet, while providing a space-optimized design of the gas inlet. In this way, the occurrence of undesired turbulences in the protective gas stream which might disturb the raw material powder bed applied onto the carrier and/or the irradiation process can be avoided in a particularly effective manner.

Thus, the absorption of radiation energy emitted by the irradiation system by welding smoke condensate material deposited onto the surface of the transmission element can be minimized and stable operating conditions can be maintained within the process chamber also during longer times of operation of the apparatus for producing a three dimensional work piece. As a result, high-quality work pieces can be produced without interrupting the operation of the apparatus for cleaning the transmission element. Furthermore, damages to the transmission element due to the deposition of welding smoke condensate can be prevented or at least considerably reduced.

Furthermore, the gas permeable, porous component which forms a gas inlet area of the gas inlet may be used as a filter for filtering particulate impurities from the gas stream prior to introducing the gas stream into the process chamber. Hence, additional filters may at least in part be dispensed with.

The gas permeable, porous component of the gas inlet may comprise a sintered material. In this context, a sintered material means a material produced by a sintering process, during which powder particles are bonded through fusion at temperatures well below their melting point. By comprising a sintered material, the gas permeable, porous component may be built up from spherical powder particles in a wide range of particle sizes being provided with exact and uniform pore sizes and pore distribution. Further, sintering enables to produce a high porosity material with shape-stability and properties of a strong metal component, while a high variety of materials can be used. Thus, by comprising a sintered material, the gas permeable, porous component of the gas inlet may be provided with a high heat resistance and advantageous structural properties when under compression, vibration and changing conditions.

Alternatively or additionally, the gas permeable, porous component of the gas inlet may comprise a fibrous material, in particular a fibrous web. Specifically, the fibrous material may include glass fibers or metal fibers. Alternatively or additionally, the gas permeable, porous component of the gas inlet may comprise an open-cell foam, in particular a metal foam.

The gas permeable, porous component of the gas inlet may be made of a material including stainless steel, bronze, titanium and/or a nickel-based alloy. Of course, the gas permeable, porous component of the gas inlet may also be made of other materials such as ceramics or of different materials.

Further, the gas permeable, porous component of the gas inlet may have a porosity between 20% and 90% and in particular a porosity of substantially 40%. In this context, the term "porosity" refers to a material property and defines a ratio of a volume of void space, i.e. empty space, over a material's total volume. The void space provided within the gas permeable, porous component may be constituted by so-called pores. The pores constituting the void space within the gas permeable, porous component may have different shapes and pores sizes. Preferably, however, the pores constituting the void space within the gas permeable, porous component have a pore size between 1 µm and 10 µm.

In a further development, the gas permeable, porous component of the gas inlet may comprise a plurality of sections with different flow resistances for gases flowing therethrough. For example, in order to be provided with different flow resistances, the plurality of sections may comprise different porosities. In view of this configuration, it may be particularly advantageous to build up the gas permeable, porous component by means of a sintering process. In this way, the gas permeable, porous component can be equipped with a complex structure including the plurality of sections of varying porosity in a simple manner.

Specifically, the plurality of sections may be arranged parallel to one another and/or in a row with regard to a flow direction of a gas flowing through the gas permeable, porous component of the gas inlet. By the configuration of the plurality of sections in the air permeable, porous component, a desired flow profile of the protective gas stream flowing through the process chamber may be adjusted by means of the gas permeable, porous component of the gas inlet in order to improve the effectiveness of the protective gas stream.

In a preferred embodiment of the apparatus for producing a three-dimensional work piece, the gas permeable, porous component of the gas inlet is arranged in a region of a first side wall of the process chamber. Specifically, the gas permeable, porous component of the gas inlet may be arranged in the first side wall of the process chamber such that the gas inlet area of the gas inlet may be arranged substantially perpendicular to the carrier and/or may be provided at an inner surface of the first side wall which faces the process chamber. The first side wall of the process chamber may be arranged opposed to a second side wall of the process chamber accommodating the gas outlet.

The gas permeable, porous component of the gas inlet preferably extends substantially across the entire width of the first side wall of the process chamber. Thus, the size of the gas inlet area formed by the gas permeable, porous component can be increased, allowing the supply of a particularly high volume flow of gas to the process chamber via the gas inlet at a particularly low pressure. By such a configuration, the gas permeable, porous component of the gas inlet ensures that a laminar protective gas stream in the process chamber is generated which is homogenously distributed across the entire width of the process chamber. This has the effect that particulate impurities present in the process chamber are prevented from reaching the transmission element in a particular effective manner.

The gas inlet area formed by the gas permeable, porous component of the gas inlet may further comprise portions which may be arranged in a region of further side walls and/or the top wall of the process chamber in order to still further increase the gas inlet area.

The gas outlet may comprise a gas outlet opening accommodated in the second side wall of the process chamber. The gas outlet opening of the gas outlet may extend substantially across the entire width and/or height of the second side wall of the process chamber. Alternatively, the gas outlet may be provided in the form of a slit-shaped gas outlet. Accordingly, the slit-shaped gas outlet may comprise a slit-shaped gas outlet opening which may be arranged in a region underneath the gas inlet.

The apparatus for producing a three-dimensional work piece may further comprise a powder layer preparation system accommodated in the process chamber and configured to apply raw material powder layers onto the carrier prior to being subjected to the electromagnetic or particle radiation irradiated by the irradiation device. Specifically, the powder layer preparation system may comprise a powder reservoir holder that can be moved to and fro across the carrier in order to apply a raw material powder to be irradiated with electromagnetic or particle radiation onto the carrier. Preferably, the gas permeable, porous component of the gas inlet is arranged in a region above the powder layer preparation system. By such a configuration, the protective gas stream generated by the gas inlet and the gas outlet may be separated from a region of the process chamber accommodating the powder layer preparation system.

The gas permeable, porous component of the gas inlet may have a thickness between 1 mm to 5 mm and in particular a thickness of 3 mm. In this context, the term "thickness" refers to a dimension of the gas permeable, porous component in the flow direction of a gas flowing through the gas inlet. Further, the gas permeable, porous component of the gas inlet may have a substantially panel-shaped form. Specifically, in case the gas permeable, porous component of the gas inlet is produced by means of a sintering process, it may be provided in form of a sintered plate.

The apparatus for producing a three-dimensional work piece may further comprise a further gas inlet for supplying gas to the process chamber. The further gas inlet may have a gas inlet opening accommodated in the first side wall of the process chamber. Specifically, the gas inlet opening of the further gas inlet may be arranged in a region underneath the gas permeable, porous component of the gas inlet. Preferably, the same gas, in particular an inert gas is supplied to the process chamber via the gas inlet and the further gas inlet. It is, however, also conceivable that different gases are directed into the process chamber via the gas inlet and the further gas inlet. The further gas inlet may be connected to a further gas supply line adapted to be flown through with the gas to be supplied into the process chamber via the further gas inlet. The further gas supply line may be connected to the gas supply line which serves to supply gas to the gas inlet. It is, however, also conceivable that the further gas supply line is designed independent from the gas supply line of the gas inlet and is, for example, directly connected to a gas source.

In particular, the gas inlet and the gas outlet may be configured and arranged in such a manner that a first gas flow of the protective gas stream may be generated having a flow directional component facing away from the transmission element. Specifically, the gas inlet and the gas outlet may be configured and arranged such that the gas supplied to the process chamber via the gas inlet, upon flowing through the process chamber, increases its distance to a wall of the process chamber accommodating the transmission element. For example, the first gas flow exiting the gas permeable, porous component of the gas inlet may flow in a direction substantially perpendicular to the gas inlet area. Thereafter, it may be directed across the transmission element such that, in the region of the transmission element, the first gas flow at least partially flows substantially parallel to the transmission element. Then, upon further flowing through the process chamber, it may be directed to the gas outlet which is preferably arranged such that the first gas flow is directed in a direction away from the transmission element. Additionally or alternatively thereto, the first gas flow may flow in the direction of the carrier.

The further gas inlet and the gas outlet may be configured and arranged in such a manner that a second gas flow of the protective gas stream across the carrier is generated. The second gas flow preferably is directed substantially parallel to the carrier so as to ensure that particulate impurities generated in the process chamber upon irradiating the raw material powder on the carrier with electromagnetic or particle radiation are purged from the process chamber by the second gas flow guided through the process chamber from the further gas inlet to the gas outlet.

By such a configuration of the gas inlet, the further gas inlet and the gas outlet, particulate impurities present in the process chamber are either prevented from reaching the transmission element or at least guided away from the transmission element in a particular effective manner.

The apparatus for producing a three-dimensional work piece may further comprise a control unit which may be designed in the form of an electronic control unit and which may be adapted to control the supply of gas to the process chamber in such a manner that a volume flow of gas into the process chamber via the gas inlet is larger than a volume flow of gas into the process chamber via the further gas inlet. This control of the gas supply to the process chamber allows preventing the transmission element from being contaminated in a particularly reliable manner.

In a further development, the apparatus may comprise a gas inlet channel connected to the gas inlet and configured to supply gas to the process chamber via the gas inlet. Specifically, the gas inlet channel may be connected to the gas permeable, porous component. Thus, the gas to be supplied to the process chamber via the gas inlet, prior to entering the gas inlet, may be directed into the gas inlet channel. The gas inlet channel may have a first portion with a first flow cross-section and a second portion downstream of the first portion with a second flow cross-section larger than the first flow cross-section. In this context, the terms "downstream" and "upstream" refer to the direction of flow of gas through the gas supply line. The gas inlet channel may be provided in form of a pressure equalization container which serves to compensate for pressure differences appearing in the gas supply line upstream of the gas inlet and in the process chamber, e.g. due to temperature differences developing during operation of the apparatus.

The second portion of the gas inlet channel may comprise a dispersion unit for dispersing a gas flow directed from the first portion into the second portion. For example, the dispersion unit may be provided in form of a disc-shaped baffle plate which may be arranged in front of a gas inlet opening of the first portion of the gas inlet channel such that an circular surface of the baffle plate faces the gas inlet opening of the first portion. Thus, the gas to be supplied to the process chamber via the gas inlet, after being directed from the first portion into the second portion of the gas inlet channel, may be guided around the disc-shaped baffle plate. As a result, due to the presence of the gas inlet channel, gas can be supplied to the process chamber via the gas inlet in a particularly uniform manner across the entire gas inlet area of the gas inlet.

In particular, the gas inlet channel may be integrated into the first side wall of the process chamber. For example, the gas inlet channel may be defined by a hollow space formed in the first side wall of the process chamber in particular upstream of the gas permeable, porous component of the gas inlet. Thus, the gas inlet channel may be installed in the apparatus in a particularly space saving manner.

In a method for producing a three-dimensional work piece, a layer of raw material powder is applied onto a carrier accommodated in a process chamber. Electromagnetic or particle radiation is selectively irradiated onto the raw material powder on the carrier by means of an irradiation device in order to produce a work piece made of said raw material powder by an additive layer construction method. Further, the electromagnetic or particle radiation emitted by the radiation device is transmitted into the process chamber via a transmission element. The method further comprises the steps of supplying gas to the process chamber via a gas inlet and discharging gas from the process chamber via a gas outlet such that a protective gas stream in the process chamber for protecting the transmission element from being contaminated by impurities present in the process chamber is generated. The gas inlet comprises a gas permeable, porous component forming a gas inlet area of the gas inlet.

The gas permeable, porous component of the gas inlet may be arranged in a first side wall of the process chamber, wherein the first side wall of the process chamber may be arranged opposed to a second side wall of the process chamber accommodating the gas outlet.

The method may further comprise the step of supplying gas to the process chamber via a further gas inlet, wherein the further gas inlet has a gas inlet opening accommodated in the first side wall of the process chamber in particular underneath the gas permeable, porous component of the gas inlet. The gas inlet and the gas outlet may be configured and arranged in such a manner that a first gas flow of the protective gas stream is generated having a flow directional component facing away from the transmission element. The further gas inlet and the gas outlet may be configured and arranged in such a manner that a second gas flow of the protective gas stream across the carrier is generated.

Preferably, the supply of gas to the process chamber is controlled in such a manner that a volume flow of gas into the process chamber via the gas inlet is larger than a volume flow of gas into the process chamber via the further gas inlet.

Figure 2:
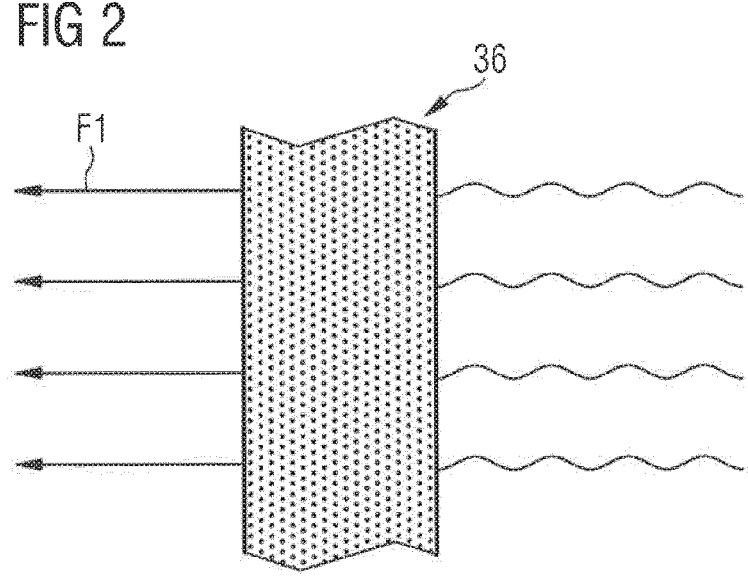
Figure 3:
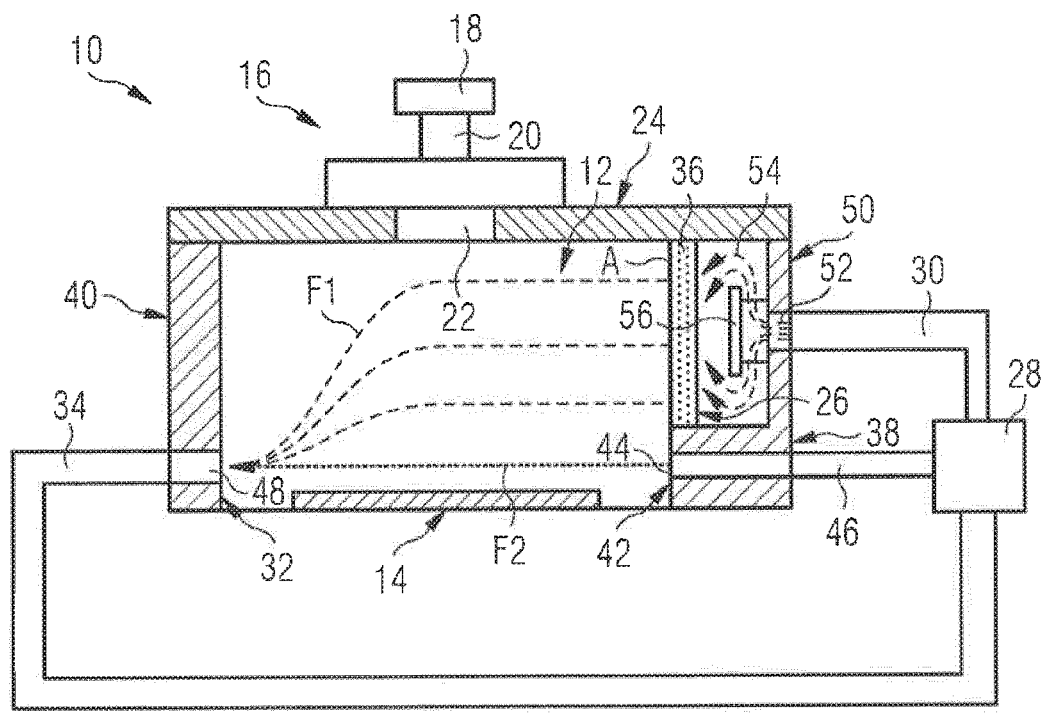

A preferred embodiment of the invention in the following is explained in greater detail with reference to the accompanying schematic drawings, in which:

FIG. 1 shows a perspective representation of an apparatus for producing a three-dimensional work piece, FIG. 2 shows a greatly enlarged cross-sectional view of a gas, permeable component installed in the apparatus according to FIG. 1, FIG. 3 shows a schematic cross-sectional view of the apparatus according to FIG. 1.

FIGS. 1 to 3 show an apparatus 10 for producing a three-dimensional work piece by an additive layering process. The apparatus 10 comprises a process chamber 12 accommodating a carrier 14 for receiving a raw material powder. A powder application device (not shown) serves to apply the raw material powder onto the carrier 14. The carrier 14 is designed to be displaceable in a vertical direction so that, with increasing construction height of a work piece, as it is built up in layers from the raw material powder on the carrier 14, the carrier 14 can be moved downwards in the vertical direction.

The apparatus 10 for producing a three-dimensional work piece further comprises an irradiation device 16 for selectively irradiating electromagnetic or particle radiation, in particular laser radiation onto the raw material powder applied onto the carrier 14 in order to produce a work piece made of said raw material powder by an additive layer construction method. In particular, by means of the irradiation device 16, the raw material powder on the carrier 14 may be subjected to electromagnetic or particle radiation in a site selective manner in dependence on the desired geometry of the component that is to be produced. The irradiation device 16 comprises a radiation source 18 which may comprise a diode pumped Ytterbium fibre laser emitting laser light at a wavelength of approximately 1070 to 1080 nm.

The irradiation device 16 further comprises an optical unit 20 for guiding and processing a radiation beam emitted by the radiation source 18. The optical unit may comprise a beam expander for expanding the radiation beam, a scanner and an object lens. Alternatively, the optical unit may comprise a beam expander including a focusing optic and a scanner unit. By means of the scanner unit, the position of the focus of the radiation beam both in the direction of the beam path and in a plane perpendicular to the beam path can be changed and adapted. The scanner unit may be designed in the form of a galvanometer scanner and the object lens may be an f-theta object lens.

The apparatus 10 further comprises a transmission element 22 which allows the transmission of the electromagnetic or particle radiation emitted by the irradiation device 16 into the process chamber 12. In the apparatus 10 depicted in the drawings, the transmission element 22 is designed in the form of a window made of glass or a polymeric material which is arranged in a region of a top wall 24 of the process chamber 12 above a center of the carrier 14. Thus, a radiation beam emitted by the irradiation device 16 can be guided through the transmission element 22 and across the carrier 14 as desired in dependence on the geometry of the work piece to be produced.

The process chamber 12 is sealed against the ambient atmosphere, i.e. against the environment surrounding the process chamber 12. As becomes apparent from FIG. 3, the process chamber 12 is provided with a gas inlet 26 for supplying gas from a gas source 28 to the process chamber 12. The gas supplied to the process chamber via the gas inlet 26 may be an inert gas such as, for example, Argon, Nitrogen or the like. It is however also conceivable to supply the process chamber 12 with air via the gas inlet 26. The gas is conveyed into the process chamber 12 via the gas inlet 26 by means of a suitable conveying device such as, for example, a pump or a blower (not shown) which is arranged in a gas supply line 30.

Further, the apparatus 10 comprises a gas outlet 32 for discharging gas from the process chamber 12. Specifically, the gas outlet 32 serves to discharge gas containing particulate impurities generated in the process chamber 12 upon irradiating the raw material powder on the carrier 14 with electromagnetic or particle radiation from the process chamber 12.

The gas outlet 32 is connected to a gas discharge line 34 which in turn is connected to the gas supply line 30 connected to the gas inlet 26 so as to define a recirculation system to which gas exiting the process chamber 12 via the gas outlet 32 is recirculated into the process chamber 12 via the gas inlet 26, In order to remove particulate impurities from gas discharged from the process chamber 12 via the gas outlet 32 prior to recirculating the gas into the process chamber 12 via the gas inlet 26, a suitable filter arrangement (not shown) is provided in the recirculation system.

The gas inlet 26 and the gas outlet 32 are configured to generate a protective gas stream F1, F2 in the process chamber 12 for protecting the transmission element 22 from being contaminated by impurities present in the process chamber 12, for example powder particles or welding smoke rising from the raw material powder applied onto the carrier 14 upon being irradiated with electromagnetic or particle radiation emitted by the irradiation device 16.

The gas inlet 26 of the apparatus 10 comprises a gas permeable, porous component 36 forming a gas inlet area A of the gas inlet 26. As becomes apparent from FIG. 2, the gas permeable, porous component 36 serves to generate a substantially laminar protective gas stream F1, F2 in the process chamber 12. Specifically, by means of the gas permeable, porous component 36, gas to be supplied to the process chamber 12 via the gas inlet 26, upon flowing through the gas permeable, porous component 36, is equalized, thereby constituting a laminar protective gas flow F1, F2 in the process chamber 12.

In the embodiment of the apparatus 10 shown in FIGS. 1 to 3, the gas permeable, porous component 36 of the gas inlet 26 comprises a sintered material and in particular is provided in form of a sintered plate. Alternatively or additionally, the gas permeable, porous component 36 of the gas inlet 26 may comprise a fibrous material, in particular a fibrous web, and/or an open-cell foam, in particular a metal foam.

Specifically, the sintered material of the gas permeable, porous component 36 is made of a material including bronze. Alternatively or additionally, it may be made of a material including stainless steel, titanium and/or a nickel-based alloy. The sintered material of the gas permeable, porous component 36, as shown in FIG. 2, comprises spherical powder particles provided with a relative uniform pore size and pore distribution. In particular, in the embodiment of the apparatus 10 shown in FIGS. 1 to 3, the gas permeable, porous component 36 of the gas inlet 26 may have a porosity of substantially 40% and a pore size between 1 μm to 10 μm.

Alternatively or additionally, the gas permeable, porous component 36 of the gas inlet 26 may comprise a plurality of sections with different flow resistances for gases flowing therethrough. For example, in order to be provided with different flow resistances, the plurality of sections may comprise different porosities.

As depicted in FIGS. 1 and 3, the gas permeable, porous component 36 of the gas inlet 26 is arranged in a region of a first side wall 38 of the process chamber 12. Specifically, the gas permeable, porous component 36 of the gas inlet 26 is arranged in the first side 38 of the process chamber 12 such that the gas inlet area A is arranged substantially perpendicular to the carrier 14 and is provided at an inner surface of the first side wall 38 which faces the process chamber 12. The first side wall 38 of the process chamber 12 is arranged opposed to a second side wall 40 accommodating the gas outlet 32. The gas permeable, porous component 36 of the gas inlet 26 extends across the entire width of the first side wall 38 of the process chamber 12 and has a substantially panel-shaped form. Further, the gas permeable, porous component 36 of the gas inlet 26 extends substantially across the entire height of the first side wall 38. In this way, the size of the gas inlet area A formed by the gas permeable, porous component 36 is increased, allowing the supply of a particularly high volume flow of gas to the process chamber 12 via the gas inlet 26 at a particularly low pressure. By such a configuration, the gas permeable, porous component 36 of the gas inlet 26 ensures that a laminar protective gas stream is directed into the process chamber 12 which is homogenously distributed substantially across the entire width and height of the process chamber 12. This has the effect that particulate impurities present in the process chamber 12 are prevented from reaching the transmission element 22 in a particular effective manner.

The apparatus 10 is further provided with a further gas inlet 42 for supplying gas to the process chamber 12. The further gas inlet 42 has a gas inlet opening 44 accommodated in the first side wall 38 of the process chamber 12, wherein the gas inlet opening 44 of the further gas inlet 42 is arranged in a region underneath the gas permeable, porous component 36 of the gas inlet 26.

The further gas inlet 42 is connected to a further gas supply line 46 which is flown through with the gas to be supplied into the process chamber 12 via the further gas inlet 42. Like the gas supply line 30 of the gas inlet 26, also the further gas supply line 46 is connected to the gas source 28. Thus, the same gas is supplied to the process chamber 12 via the gas inlet 26 and the further gas inlet 42.

The gas inlet 26 and the gas outlet 32 are configured and arranged in such a manner that a first gas flow F1 of the protective gas stream F1, F2 is generated having a flow directional component v1 facing away from the transmission element 22. Specifically, the gas inlet 26 and the gas outlet 32 are configured and arranged such that the gas supplied to the process chamber 12 via the gas inlet 26, upon flowing through the process chamber 12, increases its distance to the top wall 24 of the process chamber 12 accommodating the transmission element 22 after passing the transmission element 22. In other words, the gas supplied to the process chamber 12 via the gas inlet 26 which constitutes the first alas flow F1 at first is directed across the transmission element 22. Thus, in a region of the transmission element 22, the first gas flow F1 flows substantially parallel to the transmission element 22. Then, upon further flowing through the process chamber 12, it is directed away from the top wall 24 of the process chamber 12 accommodating the transmission element 22. Thus, as depicted in FIG. 1, the first gas flow F1 has a first flow directional component v1 which faces away from the transmission element 22 and a second flow directional component v2 which faces away from the gas inlet area A, wherein the first and the second flow directional component v1, v2 are perpendicular to one another. In the apparatus 10 shown in the drawings, this is achieved by arranging the gas inlet 26 and the gas outlet 32 in a region of opposing side walls 38, 40 of the process chamber 12, wherein the gas outlet 32 is arranged in a region underneath the gas inlet 26.

The further gas inlet 42 and the gas outlet 32 are configured and arranged in such a manner that a second gas flow F2 of the protective gas stream F1, F2 across the carrier 14 is generated. As shown in FIG. 1, the second gas flow F2 is directed substantially parallel to the carrier 14 so as to ensure that particulate impurities generated in the process chamber 12 upon irradiating the raw material powder on the carrier 14 with electromagnetic or particle radiation are purged from the process chamber 12 by the second gas flow F2 guided through the process chamber 12 from the further gas inlet 42 to the gas outlet 32. Specifically, in the apparatus 10 shown in the drawings, this is achieved by arranging a slit-shaped further gas inlet 42 and a slit-shaped gas outlet 32 in the region of opposing sidewalls 38, 40 of the process chamber 12 at substantially the same height, wherein a gas inlet opening 44 of the slit-shaped further gas inlet 42 and a gas outlet opening 48 of the slit-shaped gas outlet extend substantially across the entire width of the opposing sidewalls 38, 40. Alternatively, the gas outlet 32 may be provided in such a manner that the gas outlet opening 48 may extend substantially across the entire width and height of the second side wall 40 of the process chamber 12.

The supply of gas to the process chamber 12, by means of a control unit (not shown), is controlled in such a manner that a volume flow of gas into the process chamber 12 via the gas inlet 26 is larger than a volume flow of gas into the process chamber 12 via the further gas inlet 42. This control of the gas supply to the process chamber 12 allows preventing the transmission element 22 from being contaminated in a particularly reliable manner.

The apparatus 10 further comprises a gas inlet channel 50 connected to the gas inlet 26 and configured to supply gas to the process chamber 12 via the gas inlet 26. The gas inlet channel 50 comprises a first portion 52 with a first flow cross-section and a second portion 54 upstream of the first portion 52 with a second flow cross-section larger than the first flow cross-section. The first portion 52 is connected to the gas supply line 30. The gas inlet channel 50 is integrated into the first side wall 38 of the process chamber 12. Specifically, the gas in the channel 50 is defined by a hollow space formed in the first side wall 38 of the process chamber 12.

In the second portion 54 of the gas inlet channel, a dispersion unit 56 is provided for dispersing a gas flow directed from the first portion 52 into the second portion 54. Specifically, the dispersion unit 56 is provided in form of a disc-shaped baffle plate arranged in front of a gas inlet opening of the first portion 52 of the gas inlet channel 50 such that an circular surface 58 of the baffle plate faces the gas inlet opening of the first portion 52. Thus, the gas to be supplied to the process chamber 12 via the gas inlet 26, after being directed from the first portion 52 into the second portion 54 of the gas inlet channel 50, is guided around the disc-shaped baffle plate.

By directing the gas to be supplied to the process chamber 12 via the gas inlet 26 through the gas inlet channel 50 comprising the dispersion unit 56 prior to entering the process chamber 12, pressure differences occurring in the gas supply line 30 and in the process chamber 12, for example due to temperature differences developing during operation of the apparatus 10 can be compensated for. Further, due to the presence of the gas inlet channel 50, the gas can be supplied to the process chamber 12 via the gas inlet 26 in a particular uniform manner across the entire gas inlet area A of the gas inlet 26.

The invention claimed is:

1. An apparatus for producing a three-dimensional work piece, the apparatus comprising:
   a process chamber accommodating a carrier for receiving a raw material powder,
   an irradiation device for selectively irradiating electromagnetic or particle radiation onto the raw material powder on the carrier in order to produce a work piece made of said raw material powder by an additive layer construction method,
   a transmission element which allows the transmission of the electromagnetic or particle radiation emitted by the irradiation device into the process chamber, and
   a gas inlet for supplying gas to the process chamber and a gas outlet for discharging gas from the process chamber which are configured to generate a protective gas stream in the process chamber for protecting the transmission element from being contaminated by impurities present in the process chamber,
   wherein
      the gas inlet comprises a panel-shaped, gas permeable, porous component provided with openings and forming a gas inlet area of the gas inlet, wherein the panel-shaped gas permeable, porous component of the gas inlet is arranged in a first side wall of the process chamber, the first side wall of the process chamber being arranged opposed to a second side wall of the process chamber accommodating the gas outlet, and
      the apparatus further comprises a further gas inlet for supplying gas to the process chamber, the further gas inlet having a gas inlet opening accommodated in the first side wall of the process chamber underneath the panel-shaped, gas permeable, porous component of the gas inlet, and a baffle plate upstream of the gas inlet to disperse the gas across the panel-shaped, gas permeable, porous component of the gas inlet.

2. The apparatus according to claim 1, wherein the panel-shaped, gas permeable, porous component of the gas inlet comprises a sintered material and/or a fibrous material.

3. The apparatus according to claim 1, wherein the panel-shaped, gas permeable, porous component of the gas inlet is made of a material including stainless steel, bronze, titanium and/or a nickel-based alloy.

4. The apparatus according to claim 1, wherein the panel-shaped, gas permeable, porous component of the gas inlet has a porosity between 20% and 90% and/or a pore size between 1 µm to 10 µm.

5. The apparatus according to claim 1, wherein the panel-shaped, gas permeable, porous component of the gas inlet comprises a plurality of sections with different flow resistances for gases flowing through.

6. The apparatus according to claim 1, wherein the gas inlet and the gas outlet are configured and arranged in such a manner that a first gas flow of the protective gas stream is generated having a flow directional component facing away from the transmission element, and wherein the further gas inlet and the gas outlet are configured and arranged in such a manner that a second gas flow of the protective gas stream across the carrier is generated.

7. The apparatus according to claim 1, further comprising a control unit which is adapted to control the supply of gas to the process chamber in such a manner that a volume flow of gas to the process chamber via the gas inlet is larger than a volume flow of gas to the process chamber via the further gas inlet.

8. The apparatus according to claim 1, further comprising a gas inlet channel connected to the gas inlet and configured to supply gas to the process chamber via the gas inlet, the gas inlet channel having a first portion with a first flow cross-section and a second portion downstream of the first portion with a second flow cross-section larger than the first flow cross-section.

9. The apparatus of claim 2, wherein the panel-shaped, gas permeable, porous component of the gas inlet comprises at least one of a fibrous web and an open-cell foam.

10. The apparatus of claim 4, wherein the panel-shaped, gas permeable, porous component of the gas inlet has a porosity of 40%.

11. The apparatus of claim 2, wherein the panel-shaped, gas permeable, porous component of the gas inlet comprises a metal foam.

12. The apparatus according to claim 8, wherein the second portion comprises a dispersion unit for dispersing a gas flow directed from the first portion into the second portion.

13. The apparatus according to claim 1, wherein: the further gas inlet has a slit-shaped gas inlet opening accommodated in the first side wall of the process chamber underneath the panel-shaped, gas permeable, porous component of the gas inlet; and the gas outlet is a slit-shaped gas outlet opening accommodated in the second side wall of the process chamber at the same height as the slit-shaped gas inlet opening of the further gas inlet in the first side wall.

14. The apparatus according to claim 13, wherein the slit-shaped gas outlet opening extends across an entire width of the second side wall and the slit-shaped gas inlet opening extends across an entire width of the first side wall.

15. The apparatus according to claim 1, wherein the panel-shaped, gas permeable, porous component of the gas inlet extends across an entire width of the first side wall and across a height of the first side wall from the gas inlet opening of the further inlet to distribute the protective gas stream homogeneously across the entire width and the height.

16. An apparatus for producing a three-dimensional work piece, the apparatus comprising:
a process chamber accommodating a carrier for receiving a raw material powder,
an irradiation device for selectively irradiating electromagnetic or particle radiation onto the raw material powder on the carrier in order to produce a work piece made of said raw material powder by an additive layer construction method,
a transmission element which allows the transmission of the electromagnetic or particle radiation emitted by the irradiation device into the process chamber, and
a gas inlet for supplying gas to the process chamber and a gas outlet for discharging gas from the process chamber which are configured to generate a protective gas stream in the process chamber for protecting the transmission element from being contaminated by impurities present in the process chamber,
wherein
the gas inlet comprises a panel-shaped, gas permeable, porous component provided with openings and forming a gas inlet area of the gas inlet, wherein the panel-shaped gas permeable, porous component of the gas inlet is arranged in a first side wall of the process chamber, the first side wall of the process chamber being arranged opposed to a second side wall of the process chamber accommodating the gas outlet, and
the apparatus further comprises a further gas inlet for supplying gas to the process chamber, the further gas inlet having a gas inlet opening accommodated in the first side wall of the process chamber underneath the panel-shaped, gas permeable, porous component of the gas inlet,
wherein the panel-shaped, gas permeable, porous component of the gas inlet extends across an entire width of the first side wall and across a height of the first side wall from the gas inlet opening of the further inlet so the protective gas stream is homogeneously distributed across the entire width and the height.

* * * * *